Aug. 30, 1960  W. G. PATRIQUIN  2,950,785
REMOTELY ADJUSTABLE SHOCK ABSORBER
Filed June 6, 1956  3 Sheets-Sheet 1
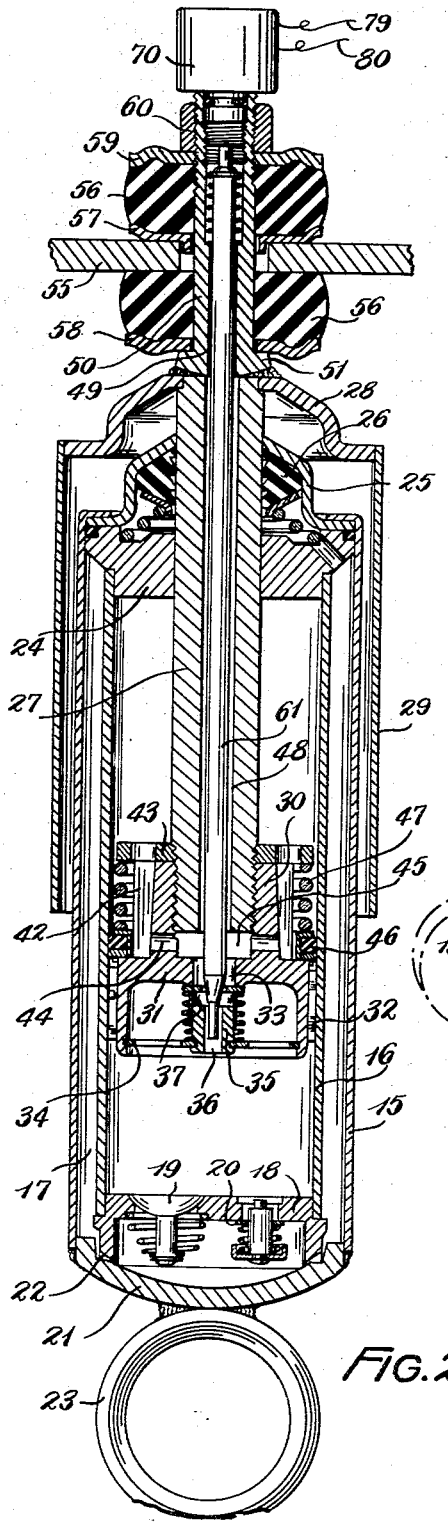
FIG. 2
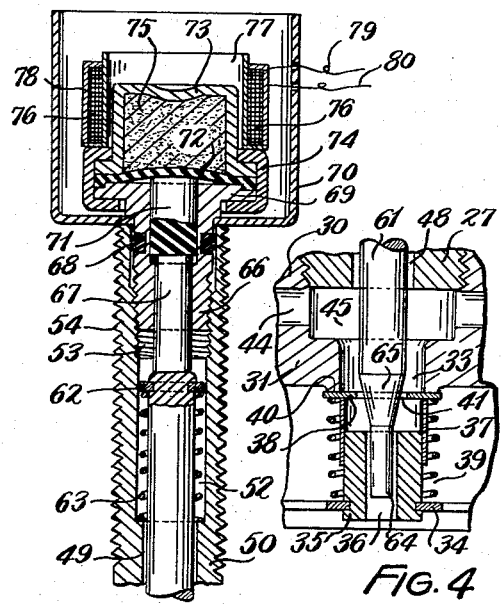
FIG. 4
FIG. 3
FIG. 1
INVENTOR.
WILLIAM G. PATRIQUIN
BY
ATTORNEYS Aug. 30, 1960 W. G. PATRIQUIN 2,950,785
REMOTELY ADJUSTABLE SHOCK ABSORBER
Filed June 6, 1956 3 Sheets-Sheet 2
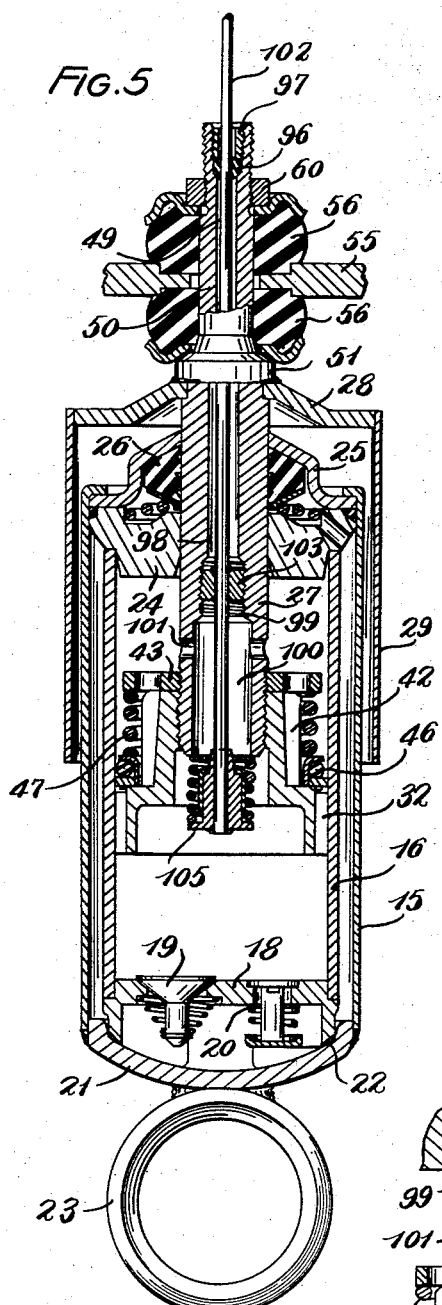
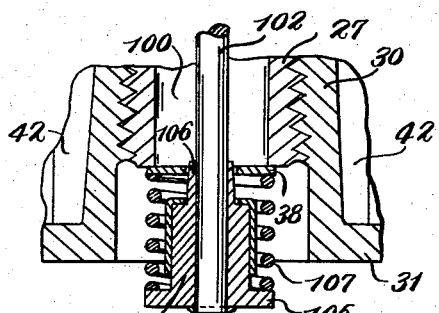
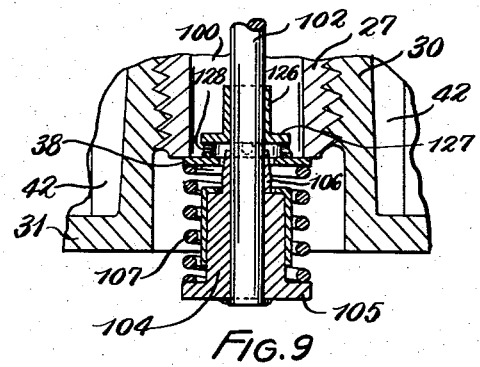
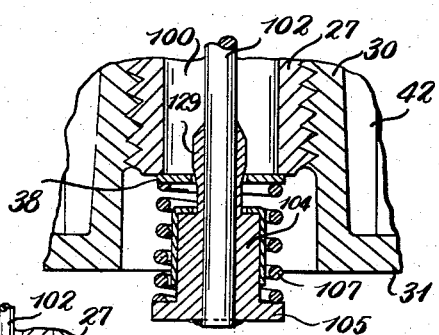
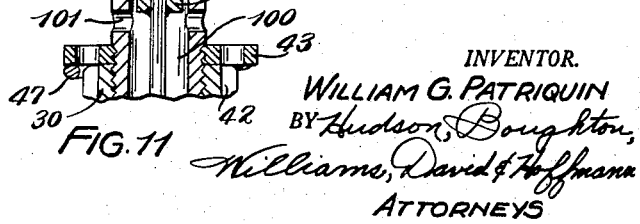
INVENTOR.
WILLIAM G. PATRIQUIN
ATTORNEYS Aug. 30, 1960     W. G. PATRIQUIN     2,950,785
REMOTELY ADJUSTABLE SHOCK ABSORBER
Filed June 6, 1956     3 Sheets-Sheet 3

INVENTOR.
WILLIAM G. PATRIQUIN
BY Hudson, Boughton,
Williams, David & Hoffmann
ATTORNEYS

United States Patent Office 2,950,785
Patented Aug. 30, 1960

2,950,785

REMOTELY ADJUSTABLE SHOCK ABSORBER

William G. Patriquin, Willoughby, Ohio, assignor to The Gabriel Company, Cleveland, Ohio, a corporation of Ohio Filed June 6, 1956, Ser. No. 589,657

16 Claims. (Cl. 188—88)

This invention relates to a shock absorber, and particularly to a shock absorber of the direct double acting hydraulic type embodying adjustable features for varying its shock absorbing characteristics and, in addition, to means for effecting the adjustment of such features from a location remote with respect to the shock absorber as, for instance, means for effecting the adjustment and operable from the dashboard or instrument panel of a motor vehicle equipped with shock absorbers embodying the invention.

An object of the invention is to provide a direct double acting hydraulic shock absorber which has improved and novel means for varying the shock absorber characteristics to provide firm, soft or intermediate shock absorbing action and which means can be adjusted readily from the exterior of the shock absorber and without requiring any disassembly thereof.

A further object is to provide a direct double acting hydraulic shock absorber which is so constructed that it has versatility in use, since various types of ride, such as firm, soft and rides intermediate thereof, can be imparted to a vehicle equipped with the same.

Another object of the invention is to provide a direct double acting hydraulic shock absorber which can have its shock absorbing characteristics readily varied from exteriorly of the shock absorber and without necessitating disassembly thereof and by means lending itself to individual adjustment of the shock absorber, either remotely from or directly at the shock absorber or to the collective adjustment of more than one of the shock absorbers remotely with respect to the shock absorbers as, for instance, from the dashboard or instrument panel of the vehicle equipped therewith.

A further object is to provide a direct double acting hydraulic shock absorber such as referred to hereinbefore, together with improved and novel means for effecting the adjustment of the shock absorber from a position remote with respect to the shock absorber and which means is such that more than one of the shock absorbers can be adjusted from the remote location.

A still further object is to provide a direct double acting hydraulic shock absorber construction having means to vary its shock absorbing characteristics together with means for adjusting said shock absorber or more than one thereof from a remote location whereby the operator of a vehicle equipped with the shock absorbers can conveniently and quickly vary their characteristics from the operator's position in the vehicle as necessitated by changing road, weather, speed and operating conditions.

Further and additional objects and advantages inherent in a construction embodying the invention will become apparent hereinafter during the detailed description of embodiments of the invention which is to follow and which embodiments are illustrated in the accompanying drawings forming part of this specification and wherein, Fig. 1 is a schematic illustration exemplifying the use of shock absorbers embodying the invention upon a four-wheeled motor vehicle, together with electrical means for effecting the adjustment of the shock absorbers remotely from the dash or instrument panel of the vehicle and such that the rear shock absorbers and the front shock absorbers can be correspondingly adjusted by the operator of the vehicle or the front shock absorbers can be given one adjustment and the rear shock absorbers a different adjustment.

Fig. 2 is a longitudinal sectional view through one of the shock absorbers shown schematically in Fig. 1.

Fig. 3 is a fragmentary longitudinal sectional view of the upper end of Fig. 2, with certain parts omitted, and on a larger scale than Fig. 2.

Fig. 4 is a fragmentary sectional view through the piston of the shock absorber shown in Fig. 2.

Fig. 5 is a longitudinal sectional view through a shock absorber embodying the invention but of modified form from that shown in Figs. 2, 3 and 4.

Fig. 6 is a fragmentary longitudinal sectional view through the piston of the shock absorber shown in Fig. 5 and is on a larger scale.

Fig. 9 is a view similar to Fig. 6 but illustrates a modified form of construction in the piston than is shown in Figs. 5 and 6.

Figure 7:
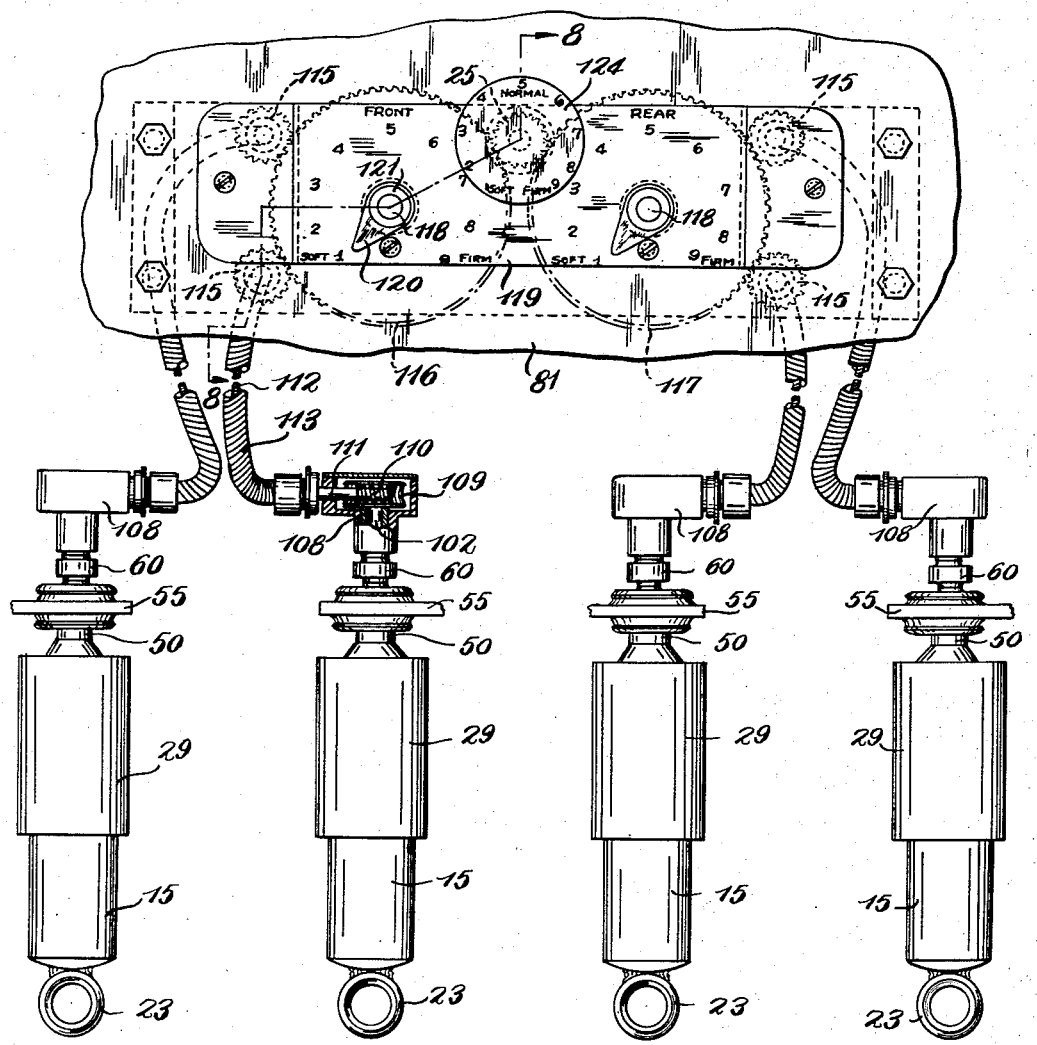
Fig. 7 illustrates a mechanical arrangement for adjusting the front and rear shock absorbers of a motor vehicle from the dash or instrument panel thereof and which shock absorbers may be considered as of the construction shown in Fig. 5.

Fig. 10 is a view similar to Figs. 6 and 9 but illustrates a still different form of construction in the piston of the shock absorber than is shown in the previous views, and Fig. 11 is a fragmentary sectional view of a modified form of adjusting nut and rod from that shown in Fig. 5 and wherein the adjusting nut is provided with a portion for varying the capacity of the ports in the piston rod that place the bore therein in communication with the pressure chamber of the shock absorber.

Referring first to Fig. 2, the shock absorber illustrated therein includes an outer cylinder 15 and an inner cylinder 16 disposed in concentric arrangement and with the inner cylinder spaced radially inwardly of the outer cylinder to provide therebetween an annular reservoir 17. The lower end of the inner cylinder 16 is closed by a head assembly 18 provided with a replenishing passage controlled by a spring-pressed replenishing valve 19 and an impact or compression passage controlled by a spring-pressed impact or compression valve 20.

The lower end of the reservoir 17 is closed by a cap 21 secured thereto and to the head assembly 18 by suitable means as, for instance, by welding. The cap 21 and the head 18 are so constructed as to provide passages 22 which place the reservoir 17 in communication with the space between the inner side of the cap 21 and the inner side of the head assembly 18. The construction of the shock absorber as thus far set forth is well known in the art and further details as to the construction of the cylinders 15 and 16, the head assembly 18 and the cap 21 at the lower end of the shock absorber need not be stated herein except to say that the cap 21 is provided centrally on its outer side with an attaching eye 23 that is rigidly connected to the cap as by welding and which enables the shock absorber to be connected to the axle of a vehicle as will be well understood.

The end of the inner cylinder 16 opposite to the end in which the head assembly 18 is mounted is fitted with and secured to a closure plug 24. The closure plug 24 has its outer end radially extended and the end of the outer cylinder 15 is spun over the outer end of the plug 24 while a sealing ring is interposed between the outer cylinder 15 and the plug 24. A retainer cap 25 is secured between the outer end of the closure plug 24 and the spun over end of the outer cylinder 15. A conical spring-pressed gasket 26 is carried by the retainer cap 25. The gasket 26 and the closure plug 24 are provided with aligned openings in which slides the piston rod 27. The piston rod 27 mounts on its inner end a piston later to be described, and on its outer end it has welded thereto a cap 28 from which depends a cylindrical shield 29 that is concentric to but spaced from the outer cylinder 15.

The piston of the shock absorber is mounted on the inner end of the piston rod 27 by means of screw threads and comprises a portion 30 of reduced diameter and a portion 31 of a diameter such as to have a sliding fit within the inner cylinder 16. The portion 31 is provided on its circumference with a plurality of circularly spaced axially extending grooves 42. Also the portion 31 is substantially of inverted cup-shape and is provided with a central bore 33 that communicates with the interior of the cup-shaped portion 31.

The portion 31 near its lower end and interiorly thereof fixedly mounts a retainer plate 34 that is provided with openings. The retainer plate 34 centrally thereof and in alignment with the bore 33 mounts a guide bushing 35 that is provided with a central passage passage 36 therethrough. Slidable on the guide bushing 35 is a guide sleeve 37 provided with suitable openings and on the upper end of which is a recoil valve disk 37 that is normally held seated by a coil spring 39 against a valve seat 40 that surrounds the end of the bore 33 and is formed on the piston portion 31. The valve disk 38 is provided with a central opening 41 while the coil spring 39 surrounds the guide bushing 35 and the guide sleeve 37 and has one end abutting the recoil valve disk 38 and its opposite end the retainer plate 34.

The piston portion 30 of reduced diameter is provided with a series of circularly spaced axially extending grooves 42 and which extend from the shoulder formed by the portion 31 to an abutment plate 43 at the upper end of the piston portion 30 and carried by the piston rod 27 and provided with openings which communicate with the grooves 42.

The piston portion 30 is provided with radially extending ports 44 that communicate with certain of the grooves 42 and with a chamber 45 in the portion 30 and located between the inner end of the piston rod 27 and the portion 31 and aligned with the bore 33. The portion 30 of the piston slidably mounts an O-ring valve assembly indicated in its entirety at 46 and normally held seated against the shoulder provided by the portion 31 by a coil spring 47 surrounding the portion 30 and having one end abutting the abutment plate 43 and its opposite end bearing on the valve assembly 46. When the valve assembly 46 is located against the shoulder referred to the grooves 32 are sealed against the passage of oil through said grooves. The O-ring valve assembly 46 need not be described in detail since its construction and mode of operation is described and fully illustrated in Christofel United States Patent No. 2,351,662.

The piston rod 27 has a central passage 48 therethrough and this passage aligns with a bore 49 formed in a tubular axial extension 50 of the piston rod 27. The extension 50 is located beyond the cap 28 and is provided with a flange or foot portion 51 that is welded or otherwise rigidly connected to the end of the piston rod 27 and to the cap 28. The bore 49 in the extension 50 communicates with a counterbore 52, the upper or outer end of which counterbore is threaded as indicated at 53. The extension 50 is externally threaded adjacent its outer end as indicated at 54.

The extension 50 extends through an opening in a frame member 55 of the vehicle to which the shock absorber is attached and is clamped in said opening by means of resilient bushings 56 surrounding the extension 50 and arranged on opposite sides of the frame member 55.

The uppermost bushing 56 bears against a metal washer 57 which has a portion extending into the opening in the frame member 55 while the lower side of the lower bushing 56 engages a metal washer 58 surrounding the extension 50 and bearing against the flange or foot portion 51 thereof.

The bushings 56 and the washers 57 and 58 are held in assembled and clamping relationship with respect to the frame member 55 and the extension 50 by means of a metal washer 59 engaging the upper end of the upper bushing 56 and surrounding the extension 50 with said washer 59 in turn engaged by a clamping nut 60 that is screwed on the external threads 54 at the upper end of the extension 50.

From the description thus far set forth it will be understood that relative movement between the axle to which the eye 23 is connected and the frame member 55 will produce relative reciprocating movement of the piston rod 27, the piston on the lower end thereof and the extension 50 with respect to the inner cylinder 16 of the shock absorber, all as will be well understood in the direct double acting shock absorber art.

A rod 61 extends through the passage 48 in the piston rod 49 in the extension 50 and has its outer end located in the counterbore 52. The outer end of the rod 61 has fixed thereto a collar 62 and a coil spring 63 in the counterbore 52 surrounds the rod 61 and has one end abutting the collar 62 and its opposite end the shoulder at the lower end of the counterbore.

The lower end of the rod 61 is provided with a cylindrical portion 64 of reduced diameter and said portion extends into the passage 36 in the guide bushing 35. The cylindrical portion 64 of reduced diameter is connected to the rod 61 by a conical or tapered portion 65 located in the central opening 41 in the recoil valve disk 38.

It will be noted that clearance is provided between the circumference of the central opening 41 and the circumference of the conical portion 65 and this clearance provides a bleed orifice through which the oil can pass from one side of the piston to the other side thereof during reciprocation of the piston in the cylinder 16.

It will be observed that if the rod 61 is moved longitudinally relative to the piston rod 27 to vary the cross section area of the conical portion 65 that is located in the opening 41 a change in the clearance referred to and in the capacity of the bleed orifice will be effected.

In Figs. 2 and 4 the conical portion 65 is shown as having substantially its mid portion located in the opening 41 and hence if the rod 61 is moved in a downward direction as viewed in the drawing from the position shown then the capacity of the bleed orifice will be reduced while if it is moved in an outward direction from that shown the capacity of the orifice will be increased.

It will be understood that various arrangements can be employed for adjustably moving the rod 61 longitudinally of and relative to the piston and piston rod and such means may be manually actuated directly at each individual shock absorber or it can be of such character as to be actuated by power or mechanically from a remote location and separately for each shock absorber or collectively for more than one shock absorber.

In the form of the invention shown in Figs. 1 to 4 inclusive it is proposed to effect adjustment of the rod 61 from a remote location, i.e., the dash or instrument panel of a vehicle to which the shock absorber is attached; and in such a way that the rods 61 of the two front shock absorbers can be simultaneously adjusted, while the rods 61 of the two rear shock absorbers can be simultaneously adjusted. The arrangement is such that the front shock absorbers may be given one adjustment and the rear shock absorbers a different adjustment or both front and rear shock absorbers may be given the same adjustment.

It is proposed to effect the adjustments through electrical and thermostatic means such as will now be described. It is proposed to use a suitable thermostatic device for controlling the position of the rod 61 and an electrical arrangement for effecting control of the thermostatic device. Although various thermostatic devices of known construction may be employed for this purpose, it is proposed to utilize a thermostatic device similar to devices now employed in the cooling systems of motor vehicles.

The thermostatic device comprises a fitting having an externally threaded end 66 which screws into the internal threads 53 in the counterbore 52 in the extension 50. The threaded end 66 of the fitting is provided with a bore that communicates with a counterbore in the opposite end of the fitting and said bore slidably mounts a plunger 67 that projects into the counterbore at one end while its opposite end engages the end of the rod 61 which is held thereagainst by the spring 63.

The fitting is provided with a circumferential groove mounting an O-ring sealing gasket 68 that seals the fitting in the end of the extension 50. Outwardly of the sealing gasket 68 the fitting is provided with an enlarged head 69 which when the fitting is assembled in the extension 50 bears against the bottom wall of a housing 70 and clamps said housing to the end of the extension 50.

The counterbore in the fitting movably mounts a plug 71 that engages the adjacent end of the plunger 67 and extends outwardly of the head 69. The plug 71 preferably is formed of a suitable material such as natural or synthetic rubber. The outer end of the plug 71 engages a flexible diaphragm 72 centrally of the latter and said diaphragm is clamped between the head 69 and a flange formed at the open end of an inverted cup-shaped member 73 with said member 73 and the head 72 held in assembled relationship by a clamping or holding ring 74.

The interior of the cup-shaped member 73 is filled with a suitable thermal responsive material 75 which may be of any well known type. It will be understood that variations in the temperature to which the material 75 is subjected will cause expansion or contraction of said material and this will cause or allow flexing of the diaphragm 72 to move the plug 71 and the plunger 67 or to permit movement thereof to adjust the position of the rod 61 in a downward direction against the load of spring 63 or in an upward direction under said spring load to change the relationship of the conical portion 65 in the opening 41 of the recoil valve 38 to vary the capacity of the bleed orifice.

In order to vary the temperatures to which the material 75 is subjected the cup-shaped member 73 is surrounded by an electrical heating coil 76 located between a spacing sleeve 77 and an enclosure 78. Electrical leads 79 and 80 extend from the heating coil 76 and through an opening in the housing 70.

Now referring to Fig. 1, an arrangement for remotely controlling the heating coils 76 of the two rear shock absorbers and of the two front shock absorbers from a remote location will now be described.

The dash or instrument panel of a motor vehicle is schematically indicated by broken lines at 81 and the battery of the vehicle at 82 in Fig. 1. One pole of the battery 82 is connected to a lead 83 in which is located the ignition switch 84. The lead 83 is connected to a lead 85 which has its opposite ends electrically connected to the movable elements 86 of a pair of rheostats 87 located on the dash. One of the rheostats 87 is connected by a lead 88 to the lead 79 of the heating coil 76 of one of the rear shock absorbers. The lead 80 of this one of the rear shock absorbers is electrically connected by a lead 89 to the lead 79 of the heating coil 76 of the other rear shock absorber. The lead 80 of said other rear shock absorber is connected to a lead 90 in turn connected to a lead 91 extending to the other pole of the battery 82. The other rheostat 87 is electrically connected by a lead 92 to the lead 79 of the heating element 76 of one of the front shock absorbers. The lead 80 from the heating element of this one front shock absorber is connected by a lead 93 to the lead 79 of the heating element 76 of the other front shock absorber while the lead 80 of the heating element of this other front shock absorber is connected to a lead 94 in turn connected to the lead 91 that extends to the other pole of the battery 82.

It will be seen that the heating elements of the two rear shock absorbers are electrically connected to the battery 82 in series through one of the rheostats 87 while the heating elements of the two front shock absorbers are similarly connected to the battery through the other rheostat 87. Thus it will be evident that the operator of the vehicle by adjusting the movable elements of the rheostats on the dash 81 will be able to vary the heat produced by the heating coils 76 of the shock absorbers and can vary this heat simultaneously and equally for both rear shock absorbers or for both front shock absorbers to effect equalized adjustment of the rods 61 for both rear shock absorbers or for both front shock absorbers. It will also be observed that the rear shock absorbers may be given one adjustment and the front shock absorbers a different adjustment or both front and rear shock absorbers may be given the same adjustment by setting both rheostats at the same point. If desired, variable intensity lamps 95 can be connected into the leads 88 and 92 and located on the dash to visually indicate to the operator of the vehicle the type of adjustment that has been given to the front and rear shock absorbers.

It will be understood that if the temperature of the heating coil 76 is increased the bleed orifice between the portion 65 of the rod 61 and the circumference of the opening 41 in the recoil valve 38 is reduced since the rod 61 moves downwardly against the load of spring 63, and as the temperature of the heating coil is reduced the capacity of the bleed orifice is increased since the rod 61 will move in an outward direction under the load of spring 63. Consequently the operator can readily change the characteristic of the shock absorbers to provide the proper ride control for particular road, speed and weather conditions since as the capacity of the bleed orifice is reduced shock absorber resistance is increased and a firmer ride is provided while when the capacity of the bleed orifice is increased the shock absorber resistance is decreased to provide a softer ride.

Although the ambient temperature to which the heating coils 76 are subjected will effect the setting of the rods 61 it will also effect the oil viscosity but adjustment of the rheostats 87 will compensate for any variation due to ambient temperature changes, wherefore the operator can obtain any type of ride regardless of the ambient temperature.

In Figs. 5 and 6 there is illustrated a construction embodying the invention and wherein the shock absorber can be adjusted by mechanical means, either directly at the shock absorber or remotely thereto as from the dash. Insofar as the construction of the shock absorber shown in Figs. 5 and 6 is identical with the construction of the shock absorber hereinbefore described, the corresponding parts are indicated in Figs. 5 and 6 by the same reference numerals as in Figs. 1 to 4 inclusive and the description of these parts need not be repeated.

In the form of construction illustrated in Figs. 5 and 6 the extension 50 is substantially the same as the extension 50 in the previous form and is provided with a bore 49 and at its outer end with a counterbore similar to the counterbore 53 of the previous form. In the counterbore in the extension 50 of the form shown in Figs. 5 and 6 a gasket 96 is positioned and held in place by an externally threaded sleeve 97 that is screwed into the threads of the counterbore. The piston rod 27 of the form shown in Figs. 5 and 6 differs from the piston rod 27 in the previously described form in the respects now to be enumerated.

In Figs. 5 and 6 the piston rod 27 adjacent its upper end is provided with a bore 98 that communicates with a threaded counterbore 99 in turn communicating with a counterbore 100 of larger diameter than the counterbore 99. The lower end of the piston rod 27 is externally threaded and above the threads the rod is provided with radial ports 101 communicating with the counterbore 100 and with the interior of the cylinder 16.

An adjusting rod 102 extends through the sleeve 97, gasket 96 and in the counterbore 99 has secured to it a nut 103 which screws longitudinally of the counterbore 99. The adjusting rod 102 at its lower end is slidably and rotatably connected to a bushing 104 which is coaxial with the rod 102 and at its lower end is provided with a radially outwardly extending annular flange 105. The opposite end of the bushing 104 is provided with a conical nipple 106 which extends into the central opening 41 in the recoil disk valve 38. The nipple 106 is of diminishing diameter from a point just above the lower end of the nipple where it joins the bushing 104 to its upper end, wherefore when the nipple is moved upwardly in the opening 41, as view in the drawing, the bleed orifice between the nipple and the circumference of said opening is reduced and, conversely, when the nipple moves downwardly in the opening the bleed orifice is increased. The disk recoil valve 38 is held seated by a coil spring 107 surrounding the bushing 104 and having one end engaging the disk valve 38 and its opposite end the flange 105. The longitudinal adjustment of the rod 102 also varies the load of the spring 107 on the valve 38 and hence changes the pressure required to unseat said valve.

It will be noted that the disk valve 38 seats directly on the lower end of the piston rod 27 in the form shown in Figs. 5 and 6 rather than on a seat formed on part of the piston as in the previously explained construction. To this extent the piston of Figs. 5 and 6 is modified from the piston of Figs. 2, 3 and 4.

It will be observed that when the adjusting rod 102 is rotated the nut 103 will rotate therewith and will screw longitudinally of the counterbore 99 in the piston rod 27 and this will cause the nipple to move either farther into or out of the opening 41 in the recoil valve 38 to adjust the size of the bleed orifice.

When the rod 102 is turned in one direction the nut 103 with the rod secured thereto will move longitudinally downwardly to position the smaller end of the nipple in the valve opening to increase the size of the bleed orifice and provide softer shock absorbing action and, conversely, when the rod is turned in a direction to cause the nut and rod to move upwardly to position the wider portions of the nipple 106 in the valve opening the size of the bleed orifice will be decreased and a firmer shock absorbing action will occur. The downward movement of the rod 102 decreases the load of spring 107 on valve 38 while the upward movement of the rod increases said load.

The adjusting rod 102 can be turned manually and directly at the upper end of the shock absorber by suitable means connected to the rod and positioned at such location as, for instance, a knob secured to the rod.

Figure 8:
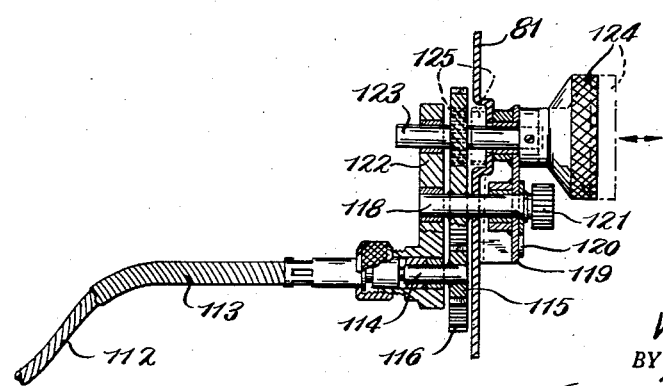
Fig. 8 is a sectional view taken on irregular line 8—8 of Fig. 7 looking in the direction of the arrows.

However, in Figs. 7 and 8 an arrangement is shown whereby the rod 102 can be turned through mechanical means from a remote location as, for instance, the dash or instrument panel of the vehicle, and also there is shown an arrangement whereby the front and rear shock absorbers of this form can be adjusted in pairs or all adjusted simultaneously.

Referring to Fig. 7 it will be seen that the upper ends of the adjusting rods 102 extend into gear housings 108 provided with internally threaded attaching portions that are screwed upon the exteriorly threaded upper ends of the tubular axial extensions 50 of Fig. 5. The adjusting rods 102 within the housings 108 have fixed thereto worm wheels 109 which mesh with worms 110 on shafts 111 that are rotatable in the housings 108. The shafts 111 are operatively connected to flexible cables 112 which are contained in suitable coverings 113.

The cables 112 extend from the shock absorbers to the dash of the vehicle on which the shock absorbers are mounted and said cables are connected to short shafts 114 rotatably supported in supporting means 122 carried by the dash. The shafts 114 have fixed thereto gears 115 with said gears being arranged in pairs to mesh with large gears 116 and 117, with the large gear 116 being indicated as operatively connected to the two front shock absorbers and the large gear 117 as operatively connected to the two rear shock absorbers.

The large gears 116 and 117 are fixed to shafts 118 rotatably supported by the dash and by an indicating panel 119 secured to the dash in a position readily seen by the operator and readily accessible to him. The shafts 118 have fixed thereto outwardly of the indicating panel 119 pointers 120 which turn with the shafts and which cooperate with indicia and graduations on the panel, one set of indicia being for the front shock absorbers and the other set for the rear shock absorbers. The shafts 118 beyond the pointers 119 have fixed thereto actuating knobs 121.

It will be seen by reference to Figs. 7 and 8 that if the actuating knob 121 for the left-hand shaft 118 is turned the adjusting rods 102 of the two front shock absorbers are turned simultaneously through the gear 116, the gears 115, the flexible cable 113, shaft 111, worm 110 and worm wheel 109. Thus the two front shock absorbers can be simultaneously adjusted from the dash and the operator can select the proper adjustment for the desired type of ride by observing the position of the pointer 120 with respect to the indicia on the panel 119. Similarly, the right-hand actuating knob 121 as viewed in Fig. 7 can be turned to simultaneously adjust the two rear shock absorbers.

There may be instances when it is desirable that both the front and rear shock absorbers be simultaneously and correspondingly adjusted and in order that the operator can do this conveniently by means of a single knob the following arrangement is employed.

The dash 81, the indicating panel 119 and the supporting means carried by the dash and indicated at 122 mounts a shaft 123 for both rotative and axial movement. The shaft 123 beyond the indicating panel 119 has fixed to its end a knurled actuating knob 124 which on its face is provided with indicia indicating different positions of shock absorber adjustment and cooperating with a reference mark which may be located on the dash.

The shaft 123 has fixed thereto a small gear 125 which when the knob 124 is against the panel 119 will mesh with both of the gears 116 and 117 but which can be disengaged from mesh with said gears by pulling the knob 124 and the shaft 123 from the full line position of Fig. 8 to the broken line position thereof and wherein said gear 125 will then be located in a suitable recess formed in the dash 81.

It will be seen that when the knob 124 is in the full line position of Fig. 8 and the gear 125 is intermeshed with the gears 116 and 117 rotation of the knob 124 will effect simultaneously corresponding and equal adjustment of all four of the shock absorbers. Assuming that the knob 124 is rotated in a clockwise direction, the gear 125 will impart counterclockwise rotation to the gears 116 and 117 and said latter gears will impart simultaneous clockwise rotation of all four of the gears 115. Conversely, if the knob 124 is rotated counterclockwise then all four of the gears 115 will have simultaneous counterclockwise rotation imparted to them. The arrangement described is such that the operator at will can adjust either both of the front shock absorbers or both of the rear shock absorbers or impart an equalized and identical adjustment to all four of the shock absorbers.

Referring to Fig. 9, the construction shown in Figs. 5 and 6 is slightly modified by the provision of a sleeve 126 on the adjusting rod 102 within the counterbore 100 in the piston rod 27. The rod 102 slides through the sleeve 126 and the latter at its end adjacent to the valve 38 is provided with an inverted cup-shaped portion 127 of larger diameter than the sleeve 126 and provided with a series of circularly spaced radial ports or openings 128. The lower end of the cup-shaped portion 127 contacts the recoil valve 38 and the purpose of said portion is to deflect the oil passing through or approaching the opening 41 in the valve 38 from a straight line longitudinal path in the counterbore 100 to a radial path through the openings or port 128.

Referring to Fig. 10, the bushing 104 is provided with a nipple 129 of different configuration than the nipple 106 previously described. It will be seen that the nipple 129 is so shaped that movement of the rod 102 in a downward direction as viewed in Fig. 10 will gradually decrease the size of the bleed orifice between the nipple and the circumference of the opening 41 in the valve while movement of the rod 102 in the upward direction will gradually increase the size of the bleed orifice. In other words, the shape of the nipple 129 is such that it functions in the reverse manner than does the nipple 106.

In Fig. 11 in place of the nut 103 a nut 130 is fixed to the rod 102 and screws longitudinally of the counterbore 99. The nut 130 has a depending portion 131 which extends into the counterbore 100. It will be seen that when the rod 102 and nut 130 are turned so as to effect downward movement of the rod and nut the circumference of the portion 131 thereof will function to block increasing areas of the radial ports 101 to lessen the capacity of said ports, and, conversely, when the rod and nut move upwardly the portion 131 will gradually move so as to increase the capacity of such ports.

It will be understood that the feature shown in Fig. 11 can be used in place of the nut 103 if desired so as to provide a secondary adjustment for the shock absorber. It will further be understood that in place of the rotating adjusting rods 102 as illustrated in Figs. 5, 6, 9, 10 and 11 such rods may be linearly adjusted by utilizing the electrical adjusting arrangement shown in Figs. 2, 3 and 4.

Although a number of embodiments of the invention have been illustrated and described herein it will be understood that the invention is susceptible of various modifications and adaptations within the scope of the appended claims.

Having thus described my invention, I claim:

1. In a direct double acting hydraulic shock absorber, a pressure cylinder, a piston rod reciprocable in said cylinder and extending outwardly of one end thereof, a piston on said rod and slidable in said cylinder and provided with a variable bleed means for the liquid and including means provided with an orifice and an adjusting rod extending through said orifice and movable in said piston rod and provided with control means varying the bleed capacity of said orifice in relation to the position of said control means in said orifice, and means operatively associated with the outwardly extending end of said piston rod and with said adjusting rod for moving the latter to vary the capacity of the bleed orifice and including a thermostatic device operatively associated with said adjusting rod and temperature changing means operatively associated with said device.

2. In a direct double acting hydraulic shock absorber as defined in claim 1 and wherein said temperature changing means is an electrical heating element.

3. In a direct double acting hydraulic shock absorber, a pressure cylinder, a piston rod reciprocable in said cylinder and extending outwardly of one end thereof and provided with a longitudinal bore therethrough, a piston on said rod and slidable in said cylinder and provided with variable bleed orifice means for the liquid in said cylinder and including an adjusting rod extending through said bore in said piston rod and movable longitudinally therein, an extension member secured to the outwardly extending end of said piston rod and provided with a longitudinal bore communicating with said piston rod bore and also provided with a counterbore into which said adjusting rod extends, said adjusting rod having its outer end in said counterbore provided with a collar, a spring surrounding said adjusting rod with one of its ends abutting said collar and its other end the shoulder in said extension member formed by said counterbore, a thermostatic device secured to said extension member and including slidable means engaging the end of said adjusting rod, and controllable heat producing means operatively associated with said thermostatic means and including an electrical heating element.

4. In combination with a vehicle having an unsprung portion provided with wheels and a sprung body portion; hydraulic shock absorbers interposed between and connected to said vehicle portions and each provided with a pressure cylinder and a piston operable therein and having variable bleed orifice means including a movable adjusting member for varying the capacity of said bleed orifice means and extending externally of the shock absorber, means operatively associated with each shock absorber and the adjusting means thereof for moving the latter and including a thermostatic device and an electrical heating element operatively associated with said thermostatic device, a source of electrical energy carried by said sprung body portion of said vehicle, and electrical connections between said source and the heating elements of said shock absorbers and including a rheostat carried by said sprung body portion of said vehicle and having a manually movable element.

5. The combination defined in claim 4 and wherein said electrical connections connect a plurality of said heating elements in series with said source of electrical energy.

6. The combination defined in claim 4 and wherein the unsprung portion of said vehicle includes multiple front wheels and multiple rear wheels and said shock absorbers are correlated to said front and rear wheels, while the electrical connections between the source of electrical energy and the heating elements of said shock absorbers connect the heating elements of the shock absorbers for the front wheels in series circuit with said source and the heating elements for the shock absorbers for the rear wheels in series circuit with said source, each of said series circuits including a rheostat on said sprung body portion.

7. In a shock absorber having a cylinder and piston, a piston rod extensible from said piston to the outside of said cylinder, said cylinder being adapted to be secured to one part of an automotive vehicle and said piston being adapted to be secured to another part of an automotive vehicle and said parts being relatively movable with respect to each other, said piston rod having a hollow interior, an annular seat axially adjacent the end of said piston rod within said piston, the inner margin of which defines an orifice for the flow of hydraulic fluid from one side of said piston to the other, a valve rod slidably guided in said piston rod and extending through said orifice, a valve on the inner end of said valve rod and having a tapered valve face extending through said orifice to vary the flow area thereof depending upon the position of said valve, a thermal element secured to the end of said piston rod and comprising a casing on the outside of said piston rod and containing a fusible thermally expansible material, an element piston extensibly movable with respect to said casing upon fusion of the fusible material contained therein and having engagement with the outer end of said valve rod for operating said valve to vary the passage of hydraulic fluid through said orifice, a resistance heater associated with said casing to heat the same and effect extensible movement of said element piston with respect to said element cylinder, and a spring returning said element piston upon reductions in temperature and biasing said valve in a return direction.

8. In a shock absorber having a cylinder and piston, a piston rod extensible from said piston to the outside of said cylinder, said cylinder being adapted to be secured to one part of an automotive vehicle and said piston being adapted to be secured to another part of an automotive vehicle and said parts being relatively movable with respect to each other, said piston rod having a hollow interior with a valve seat on the inner end thereof forming a restrictive orifice, communicating passageways leading from the hollow interior thereof to said cylinder, a valve having a tapered valve face movable along said valve seat to vary the restriction of the orifice therethrough and the flow of fluid from one side of said piston to the other in accordance with the position of said valve along said seat, a valve rod carrying said valve and guided within said piston rod, a thermal element comprising an element cylinder extending within said piston rod and having a casing on the outside of said piston rod containing a fusible thermally expansible material and an element piston extensible from said cylinder upon predetermined increases in temperature and having engagement with said valve rod, a resistance heater selectively energizable to heat said casing and effect extension of said element piston from said element cylinder and the movement of said valve with respect to said seat, and a spring biasing said valve towards said seat and returning said element piston within said element cylinder upon the deenergization of said heater.

9. In a shock absorber having a cylinder and piston, a piston rod extensible from said piston to the outside of said cylinder, said cylinder being adapted to be secured to one part of an automotive vehicle and said piston being adapted to be secured to another part of an automotive vehicle and said parts being relatively movable with respect to each other, said piston rod having a hollow interior, an annular seat on the end of said piston rod within said piston, the inner margin of which defines an orifice for the flow of hydraulic fluid from one side of said piston to the other, a valve rod slidably guided in said piston rod and extending through said orifice, a valve on the inner end of said valve rod and having a tapered valve face extending through said orifice to vary the flow area thereof depending upon the position of said valve, a thermal element secured to the end of said piston rod and comprising a casing on the outside of said piston rod and containing a fusible thermally expansible material, an element piston extensibly movable with respect to said casing upon fusion of the fusible material contained therein and having engagement with the outer end of said valve rod for operating said valve to vary the passage of hydraulic fluid through said orifice, a resistance heater associated with said casing to heat the same and effect extensible movement of said element piston with respect to said element cylinder, and a spring returning said element piston upon reductions in temperature and biasing said valve in a return direction.

10. In a shock absorber having a cylinder and piston, a piston rod extending from said piston to the outside of said cylinder, said cylinder being adapted to be secured to one part of an automotive vehicle and said piston being adapted to be secured to another part of an automotive vehicle and said parts being relatively movable with respect to each other, said piston rod having a hollow interior, an annular seat axially adjacent the end of said piston rod within said piston, a recoil valve engageable with said seat and provided with a central opening, spring means abutting said recoil valve and acting to normally seat said recoil valve against said seat, an adjusting rod slidably guided in said piston rod and extending through said opening in said recoil valve and provided with a tapered metering valve located in said opening and acting to vary the flow area of the opening depending upon the position of said metering valve, said adjusting rod also being provided with abutting means for said spring means, a thermal element secured to the end of said piston rod and comprising a casing on the outside of said piston rod and containing a fusible thermally expansible material, an element piston extensibly movable with respect to said casing upon fusion of the fusible material contained therein and having engagement with the outer end of said adjusting rod for operating the latter to vary the position of said metering valve in said opening in said recoil valve and to vary the load of said spring means on said recoil valve, a resistance heater associated with said casing to heat the same and effect extensible movement of said element piston with respect to said element casing, and a spring returning said element piston upon reductions in temperature and biasing said adjusting rod in a return direction.

11. In a direct double acting hydraulic shock absorber, a pressure cylinder, a piston rod reciprocable in said cylinder and extending outwardly of one end thereof and provided with a longitudinal bore therethrough, a piston on said rod and slidable in said cylinder and provided with variable bleed orifice means for the liquid in said cylinder and including an adjusting rod extending through said bore in said piston rod and movable longitudinally therein, the outwardly extending end of said piston rod having an extension provided with a longitudinal bore communicating with said piston rod bore and also provided with a counterbore into which said adjusting rod extends, said adjusting rod having its outer end in said counterbore provided with a collar, a spring surrounding said adjusting rod with one of its ends abutting said collar and its other end the shoulder in said extension formed by said counterbore, a thermostatic device secured to said extension and including slidable means engaging the end of said adjusting rod, and controllable heat producing means operatively associated with said thermostatic means and including an electrical heat element.

12. In a shock absorber having a cylinder and piston, a piston rod extensible from said piston to the outside of said cylinder, said cylinder being adapted to be secured to one part of an automotive vehicle and said piston being adapted to be secured to another part of an automotive vehicle and said parts being relatively movable with respect to each other, said piston rod having a hollow interior, an annular seat axially adjacent the end of said piston rod within said piston, the inner margin of which defines an orifice for the flow of hydraulic fluid from one side of said piston to the other, a valve rod movable longitudinally in said piston rod and extending through said orifice, a valve adjacent the inner end of said valve rod and movable with the latter and having a tapered valve face extending through said orifice to vary the flow area thereof depending upon the position of said valve, a thermal element secured to the end of said piston rod and comprising a casing on the outside of said piston rod and containing a fusible thermally expansible material, an element piston extensibly movable with respect to said casing upon fusion of the fusible material contained therein and having engagement with the outer end of said valve rod for operating said valve to vary the passage of hydraulic fluid through said orifice, a resistance heater associated with said casing to heat the same and effect extensible movement of said element piston with respect to said element cylinder, and a spring returning said element piston upon reductions in temperature and biasing said valve in a return direction.

13. In a shock absorber having a cylinder and piston, a piston rod extensible from said piston to the outside of said cylinder, said cylinder being adapted to be secured to one part of an automotive vehicle and said piston being adapted to be secured to another part of an automotive vehicle and said parts being relatively movable with respect to each other, said piston rod having a hollow interior with a valve seat adjacent the inner end thereof forming a restrictive orifice, communicating passageways leading from the hollow interior of said piston rod to said cylinder and spaced longitudinally of said piston rod from said valve seat, a valve having a tapered valve face movable relative to said valve seat to vary the restriction of the orifice therethrough and the flow of fluid from one side of said piston to the other in accordance with the position of said valve relative to said seat, a valve rod carrying said valve and movable longitudinally within said piston rod, a thermal element comprising an element cylinder extending within said piston rod and having a casing on the outside of said piston rod containing a fusible thermally expansible material and an element piston extensible from said element cylinder upon predetermined increases in temperature and having engagement with said valve rod, a resistance heater selectively energizable to heat said casing and effect extension of said element piston from said element cylinder and the movement of said valve with respect to said seat, and a spring biasing said valve toward said seat and returning said element piston within said element cylinder upon the deenergization of said heater.

14. In a shock absorber having a cylinder and piston, a piston rod extensible from said piston to the outside of said cylinder, said cylinder being adapted to be secured to one part of an automotive vehicle and said piston being adapted to be secured to another part of an automotive vehicle and said parts being relatively movable with respect to each other, said piston rod having a hollow interior, an annular seat on said piston rod adjacent the end thereof and within said piston, the inner margin of which seat defines an orifice in communication with the hollow interior of said piston rod for the flow of hydraulic fluid from one side of said piston to the other, communicating passageways leading from the hollow interior of said piston rod to said cylinder and spaced longitudinally of said piston rod with respect to said valve seat and said piston, a valve rod movable longitudinally in the hollow interior of said piston rod and extending through said orifice, a valve on said valve rod and having a tapered valve face extending through said orifice to vary the flow area thereof depending upon the position of said valve, a thermal element secured to the end of said piston rod and comprising a casing on the outside of said piston rod and containing a fusible thermally expansible material, an element piston extensibly movable with respect to said casing upon fusion of the fusible material contained therein and having engagement with the outer end of said valve rod for operating said valve to vary the passage of hydraulic fluid through said orifice, a resistance heater associated with said casing to heat the same and effect extensible movement of said element piston with respect to said element cylinder, and a spring returning said element piston upon reductions in temperature and biasing said valve in a return direction.

15. In a shock absorber having a cylinder and piston, a piston rod extending from said piston to the outside of said cylinder, said cylinder being adapted to be secured to one part of an automotive vehicle and said piston being adapted to be secured to another part of an automotive vehicle and said parts being relatively movable with respect to each other, said piston rod having a hollow interior, an annular seat axially adjacent the end of said piston rod within said piston, a recoil valve engageable with said seat and provided with a central opening, spring means abutting said recoil valve and acting to normally seat said recoil valve against said seat, an adjusting rod movable longitudinally of the hollow interior of said piston rod and extending through said opening in said recoil valve and provided with a tapered metering valve located in said opening and acting to vary the flow area of the opening depending upon the position of said metering valve, said adjusting rod also being provided with abutting means for said spring means, a thermal element secured to the end of said piston rod and comprising a casing on the outside of said piston rod and containing a fusible thermally expansible material, an element piston extensibly movable with respect to said casing upon fusion of the fusible material contained therein and having engagement with the outer end of said adjusting rod for operating the latter to vary the position of said metering valve in said opening in said recoil valve and to vary the load of said spring means on said recoil valve, a resistance heater associated with said casing to heat the same and effect extensible movement of said element piston with respect to said element casing, and a spring returning said element piston upon reductions in temperature and biasing said adjusting rod in a return direction.

16. In a shock absorber as defined in claim 15 wherein said adjusting rod is provided on its end within said piston with a member extending longitudinally of said adjusting rod and movable therewith and provided on one end with a portion constituting said tapered metering valve and on the other end with a flange constituting said abutting means for said spring means.

References Cited in the file of this patent

UNITED STATES PATENTS

| | | |
|---|---|---|
| 844,884 | Mans | Feb. 19, 1907 |
| 893,386 | Schultz et al. | July 14, 1908 |
| 1,920,192 | Fox | Aug. 1, 1933 |
| 1,999,474 | Page | Apr. 30, 1935 |
| 2,078,615 | Simon | Apr. 27, 1937 |
| 2,139,817 | Gogan | Dec. 13, 1938 |
| 2,723,006 | Wyeth | Nov. 8, 1955 |
| 2,780,321 | Sturari | Feb. 5, 1957 |

FOREIGN PATENTS

| | | |
|---|---|---|
| 1,043,175 | France | June 10, 1953 |
| 1,097,456 | France | Feb. 16, 1955 |